United States Patent [19]

Ermanski

[11] Patent Number: 4,555,081
[45] Date of Patent: Nov. 26, 1985

[54] TILTABLE AND SWIVABLE MOUNTING ASSEMBLY FOR A VIDEO DISPLAY TERMINAL

[75] Inventor: Albert G. Ermanski, Auburn, Mass.

[73] Assignee: Wright Line, Inc., Worcester, Mass.

[21] Appl. No.: 435,571

[22] Filed: Oct. 19, 1982

[51] Int. Cl.$^4$ .................................................. F16M 11/12
[52] U.S. Cl. ................................... 248/183; 248/397; 248/349; 74/89; 74/96
[58] Field of Search ............... 248/183, 184, 185, 349, 248/371, 357; 74/89, 96; 297/258, 261, 314

[56] References Cited

U.S. PATENT DOCUMENTS

| | | | |
|---|---|---|---|
| D. 102,967 | 1/1937 | Daum | 248/349 |
| 344,255 | 6/1886 | Doubler | 297/261 |
| 1,246,261 | 11/1917 | Gossett | 297/314 |
| 1,386,025 | 8/1921 | Pittman | 248/183 |
| 1,599,941 | 9/1926 | Ammon | 297/314 |
| 1,732,113 | 10/1929 | Van Der Meer | 248/349 |
| 1,943,360 | 1/1934 | Arnold | 248/183 |
| 2,351,293 | 6/1944 | Saunders | 248/349 |
| 2,796,226 | 6/1957 | Dalton | 248/183 |
| 3,353,416 | 11/1967 | Flint | 74/89 |
| 3,466,089 | 9/1969 | Stueckle | 297/314 |
| 3,603,545 | 9/1971 | Boniface | 248/184 |
| 3,970,792 | 7/1976 | Benham | 248/183 |
| 4,040,587 | 8/1977 | Gottschalk | 248/185 |
| 4,125,032 | 11/1978 | Shuler | 74/96 |
| 4,225,105 | 9/1980 | Nakamura | 248/185 |
| 4,247,069 | 1/1981 | Kurz | 248/185 |

FOREIGN PATENT DOCUMENTS

| | | | |
|---|---|---|---|
| 793880 | 4/1958 | United Kingdom | 248/349 |
| 1330491 | 9/1973 | United Kingdom | 248/185 |

*Primary Examiner*—J. Franklin Foss
*Assistant Examiner*—Robert A. Olson
*Attorney, Agent, or Firm*—Milton E. Gilbert; Gary E. Ross

[57] ABSTRACT

A mounting assembly for use in mounting a video display terminal on the top surface of a workstation stand which can be tilted back and forth to allow the video display terminal to be positioned for the most comfortable, glare-free viewing and which can be swiveled about a vertical axis to change the viewing direction is disclosed.

17 Claims, 23 Drawing Figures

TILTABLE AND SWIVABLE MOUNTING ASSEMBLY FOR A VIDEO DISPLAY TERMINAL

BACKGROUND OF THE INVENTION

The present invention relates generally to a mounting assembly for a video display terminal and more particularly to a mounting assembly for use in supporting a video display terminal on a workstation stand which is constructed so that the video display terminal can be tilted back and forth relative to the workstation stand and which is constructed so that the video display terminal can be rotated about a vertical axis on the workstation stand.

Video display terminals are usually mounted on a workstation stand or other type of similar structure such as a desk or a table. Quite often, because of the height of the user and/or the construction of video display terminal, when the video display terminal is seated on the workstation stand it is not angularly positioned relative to the user for the most confortable, glare-free viewing. Also, depending on where the user is seated relative to the workstation stand, it is often necessary, or desirable, to turn the video display terminal to the left or to the right so that it can be positioned for the most convenient viewing. Video display terminals are not normally constructed so that they can be tilted back and forth to adjust the viewing angle and because of their weight cannot be easily turned to change their viewing direction. As can therefore be appreciated, the needs exists for a mounting assembly for use in supporting a video display terminal on a workstation stand which is constructed so that the video display terminal can be tilted back and forth when desired and/or rotated when desired.

It is therefore an object of this invention to provide a new and improved mounting assembly.

It is another object of this invention to provide a mounting assembly for use in supporting a video display terminal on a workstation stand which is constructed so that the video display terminal can be tilted back and forth relative to the workstation stand.

It is still another object of this invention to provide a mounting assembly for use in supporting a video display terminal which is constructed so that the video display terminal can be rotated about a horizontal axis relative to the workstation stand.

It is yet still another object of this invention to provide a tilting mechanism which has a high mechanical advantage.

It is a further object of this invention to provide a tilting mechanism which includes crescent shaped rockers which rock back and forth to produce tilting movement.

It is another of this invention to provide a swivel mechanism which does not include roller type bearings.

It is yet another object of this invention to provide a mounting assembly as described above which is very reliable, relatively inexpensive to fabricate and easy to assemble and use.

SUMMARY OF THE INVENTION

A mounting assembly for use in supporting a video display on the top surface of a workstation stand includes a top member for receiving thereon the video display to be supported, a base assembly for engaging the top surface of the workstation stand and an intermediate block assembly disposed between the table top and the base assembly, the intermediate block assembly including a bridge housing fixedly attached to the base assembly, a first rocker fixedly attached to the top member and seated on the bridge housing for rocking movement back and forth relative to the bridge housing, a second rocker seated on the bridge housing for rocking movement and fixedly attached to the top member and a lever arm coupled to the first rocker and pivotally mounted on the bridge housing, whereby, pivotal movement of the lever arm will produce a tilting movement of the top member relative to the base assembly.

Various features, aspects and advantages of the invention will in part be pointed out, and in part be apparent from, the following description of a preferred embodiment of the invention, considered together with the accompanying drawings.

BRIEF DESCRIPTION OF THE DRAWINGS

In the drawings wherein like reference numerals represent like parts.

DETAILED DESCRIPTION OF PREFERRED EMBODIMENTS

The present invention is directed to a mounting assembly for use in supporting a video display terminal on a workstation stand which can be tilted back and forth to allow the video display terminal to be positioned for the most comfortable, glare-free viewing angle and swiveled about a vertical axis to adjust the directional alignment.

The mounting assembly is made up of a top member for supporting the video display terminal, a base assembly for engaging the top surface of the workstation stand and an intermediate block assembly disposed between the table top and base assembly.

The intermediate block assembly includes a bridge housing, having a pair of spaced apart, transverse slots, a pair of crescent shaped rockets, a lever arm and a thumbwheel. The rockers are fixedly attached to the top member and are seated in the slots in the bridge housing on rollers for rocking movement back and forth. The lever arm is pivotally coupled at one end to the first rocker through a first actuator pin, is pivotally coupled at an intermediate location along its length to the bridge housing through a second actuator pin which acts as a fulcrum and is pivotally attached at the other end to the thumbwheel through a third actuator pin which is slidably mounted on the lever arm and which rides in a spiral groove formed on one side of the thumbwheel.

The base assembly includes a top plate which is fixedly attached to the bridge housing, a bottom plate which is connected to the top plate by a thrust bearing and a set of bumpers which are mounted on the top plate and extend down and rest on the bottom plate.

In the operation of the mounting assembly, turning of the thumbwheel produces a pivoting movement of the lever arm about its fulcrum. The pivoting movement of the lever arm causes a rocking movement of the rocker connected to the lever arm relative to the bridge housing which produces a tilting of the top member which is fixedly attached to the rocker relative to the base assembly. Since the second rocker is fixedly attached to the top member, tilting movement of the top member produces a corresponding rocking movement of the second rocker. Due to the mechanical advantage produced by the lever arm and by the thumbwheel, the force needed to turn the thumbwheel to tilt the top member is small in comparison to the weight of the video display terminal on the top member. Swiveling movement of the mounting assembly is achieved by rotating the top member relative to the bottom plate in the base assembly.

In order to accommodate the axial movement of the lever arm relative to the first rocker and in order to accommodate the arcuate rocking movement of the first rocker relative to the lever arm as the lever arm is pivotally moved, the first actuator pin is not directly coupled to the first rocker but, rather, extends into an enlarged hole formed in a knuckle which is rotatably mounted in a groove formed in the first rocker.

It is to be understood that although the invention will be hereinafter described specifically in connection with supporting a video display terminal on a workstation stand, the invention may also, if desired, be used to support other types of devices on other types of supporting structures.

Referring now to the drawings (and in particular to FIGS. 1 through 3) there is illustrated a mounting assembly constructed according to the teachings of the present invention and identified generally by reference numeral 11.

Figure 1:
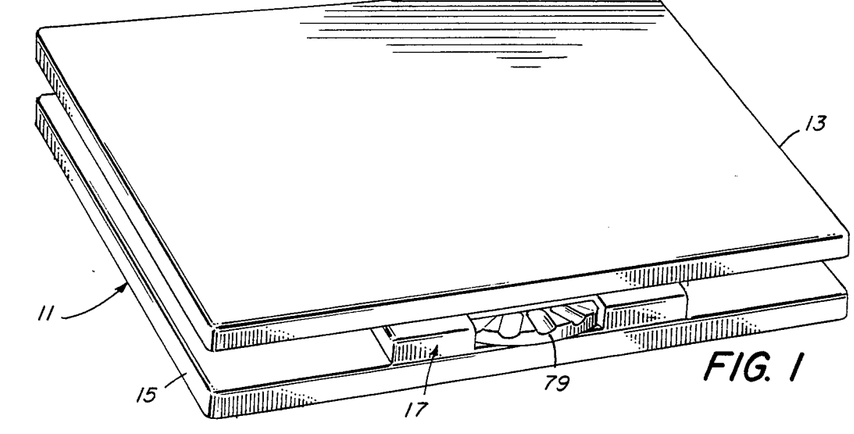
FIG. 1 is a perspective view, taken from the right and looking down, of a mounting assembly constructed according to the teachings of the present invention.
Figure 2:
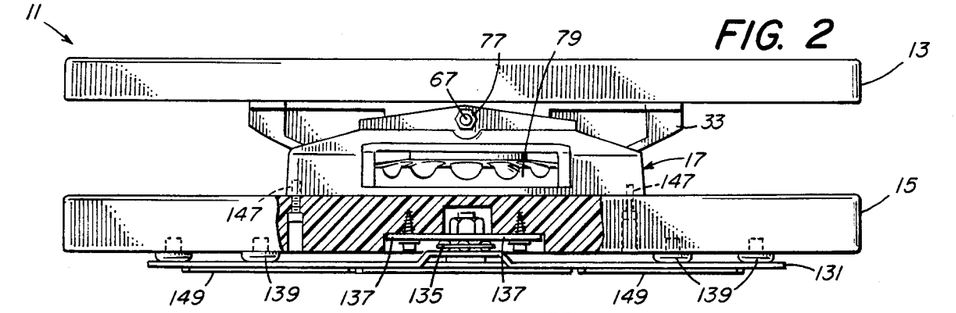
FIG. 2 is a side view taken from the right and partly broken away in section of the mounting assembly shown in FIG. 1.
Figure 3:
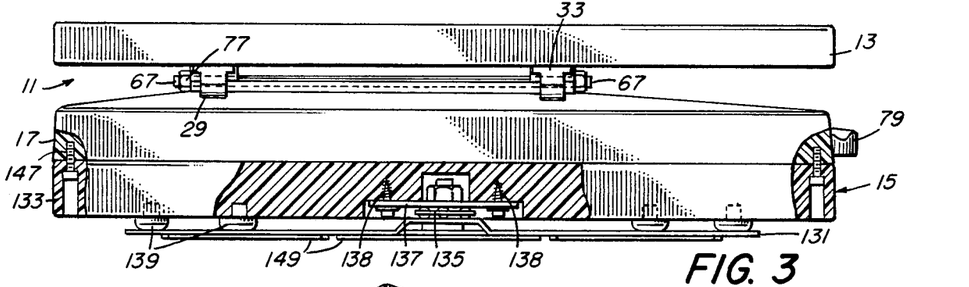
FIG. 3 is a front view partly broken away in section of the mounting assembly shown in FIG. 1.

Mounting assembly 11 includes a top member 13 which is adapted to receive thereon a video display, a base assembly 15 which is adapted to engage the load supporting surface of a workstation stand and an intermediate block assembly 17 which is disposed between the top member 13 and base assembly 15.

Figure 4:
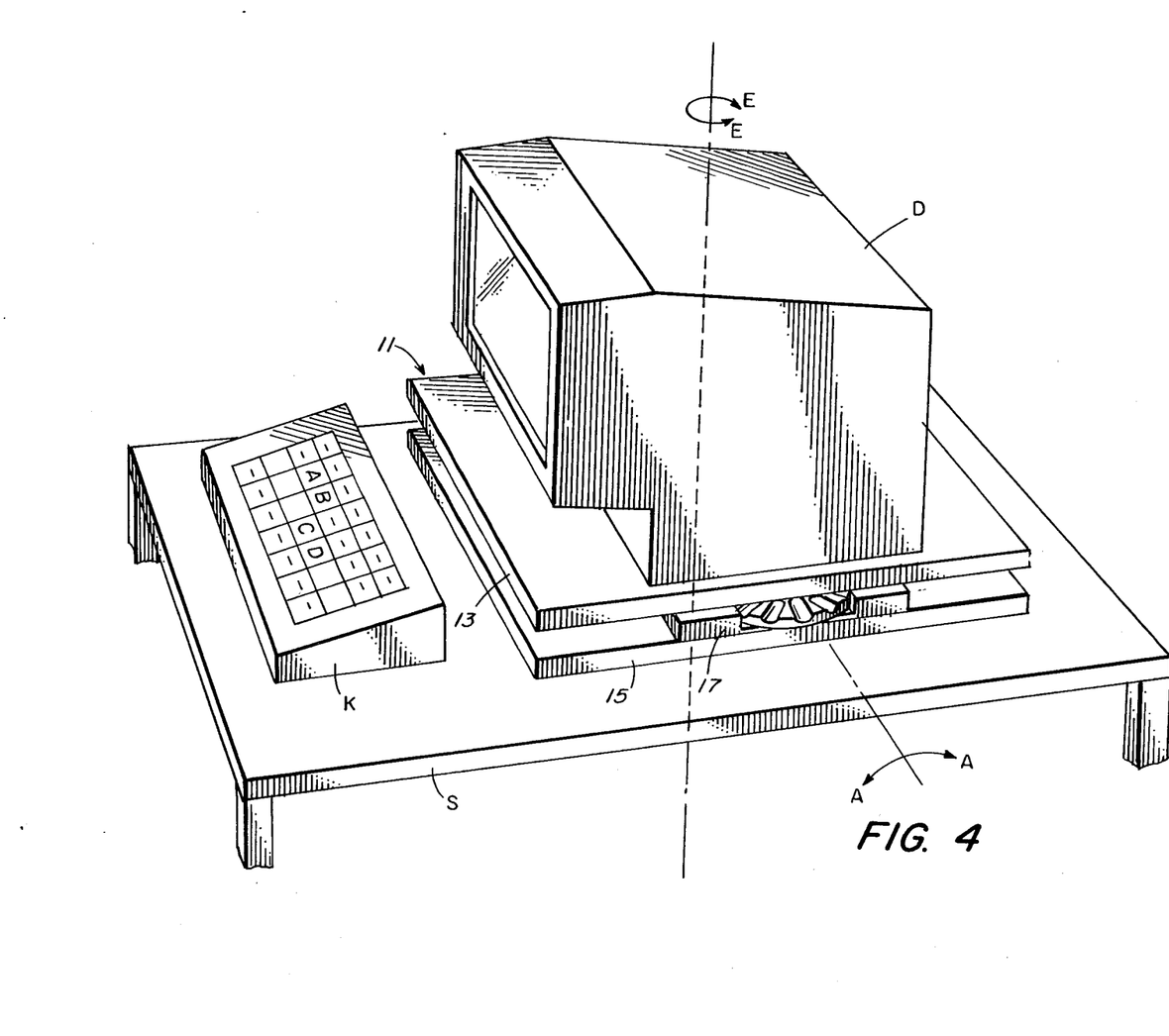
FIG. 4 is a simplified perspective view of a workstation stand, the mounting assembly shown in FIG. 1 seated on the workstation stand, a video display terminal seated on the mounting assembly and a keyboard seated on the workstation stand.

In use, (as shown in FIG. 4) mounting assembly 11 is placed on a workstation stand S. A video display terminal D is placed on top of mounting assembly 11 and a keyboard K, which is associated with video display terminal D is placed on workstation stand S in front of video display terminal D. As will hereinafter be explained in detail, mounting assembly 11 is adapted so that video display terminal D can be tilted back and forth in the direction shown by arrows A and can be swiveled about a vertical axis M in the direction shown by arrows E.

Figure 5:
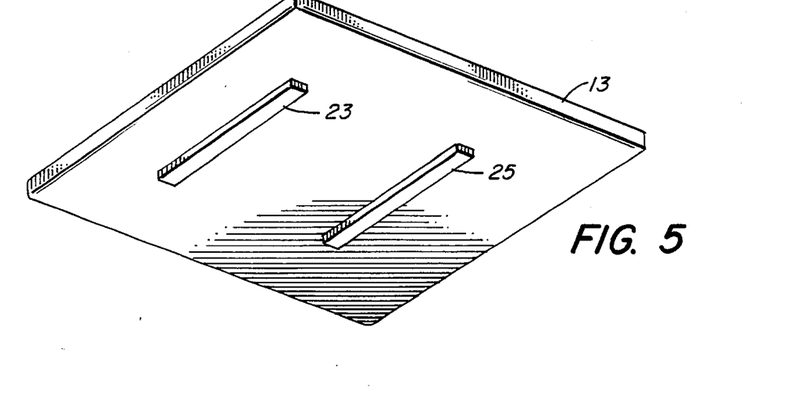
FIG. 5 is a perspective view taken from the bottom of the top member in the mounting assembly shown in FIG. 1.

Top member 13 is a generally rectangular block of rigid material, such as plastic and is sized and of a suitable thickness to accommodate video display terminal D. Top member 13 has a top surface 19 which is flat and a bottom surface 21 which has a pair of integrally formed, spaced apart, laterally extending mounting ribs 23 and 25.

Intermediate block assembly 17 (See FIGS. 6-11) includes a bridge housing 27 which is generally rectangular in shape and which is made of a block of rigid material, such as plastic. The length dimension of bridge housing 27 (i.e. from left to right in FIG. 7) is about the same as the length dimension of top member 13 while the width dimension of bridge housing 27 is somewhat less than the width dimension of top member 13. Bridge housing 27 is shaped to include a top wall 27-1 that has a curved top surface 27-2, a flat bottom surface 27-3, four side walls 27-4, 27-5, 27-6 and 27-7 and a plurality of ribs 27-8 which extend downward from top wall 27-1.

Figure 6:
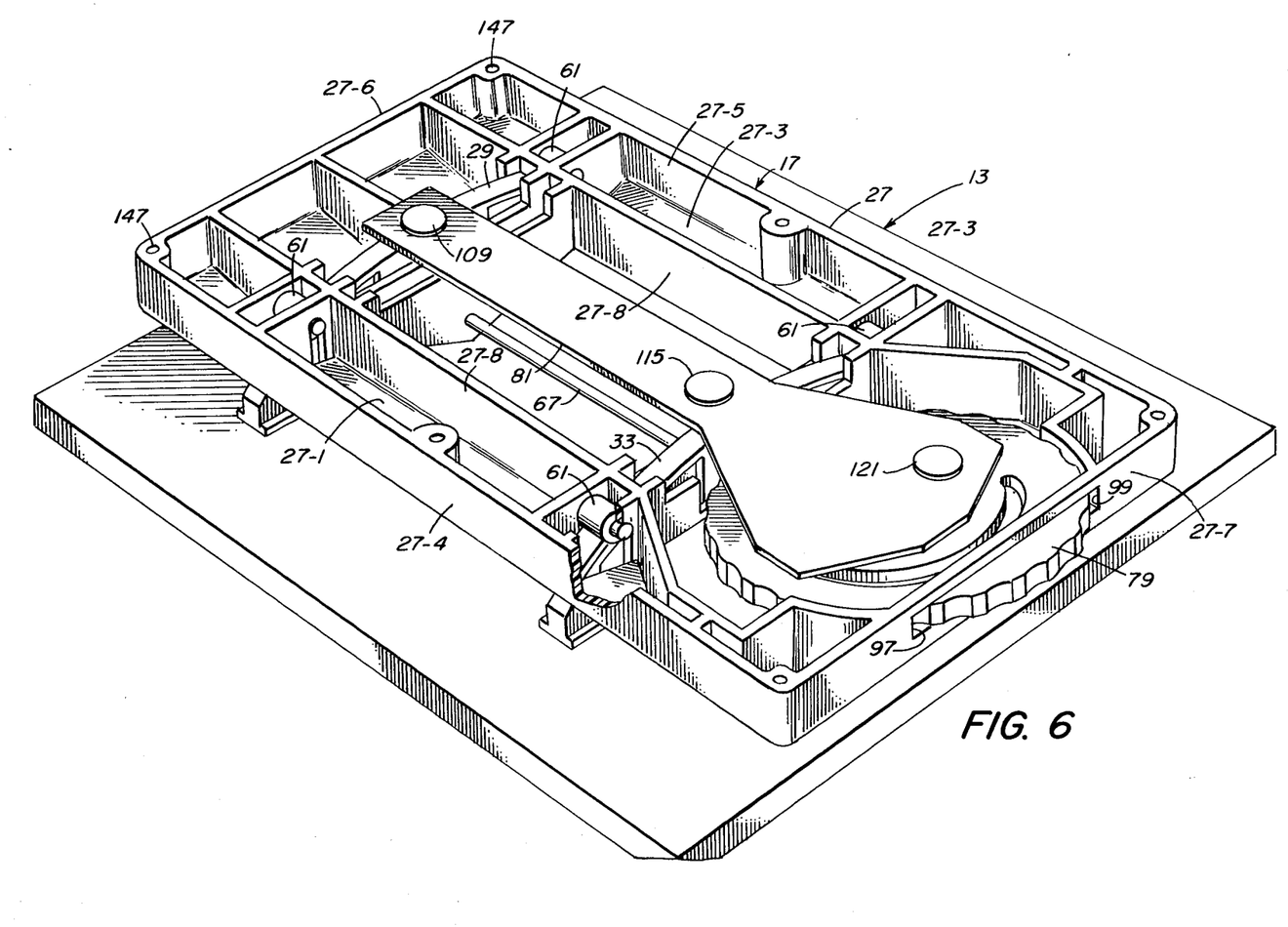
FIG. 6 is a perspective view taken from the bottom and partly broken away in section of the intermediate block assembly shown in FIG. 1 and the top member shown in FIG. 1.
Figure 7:
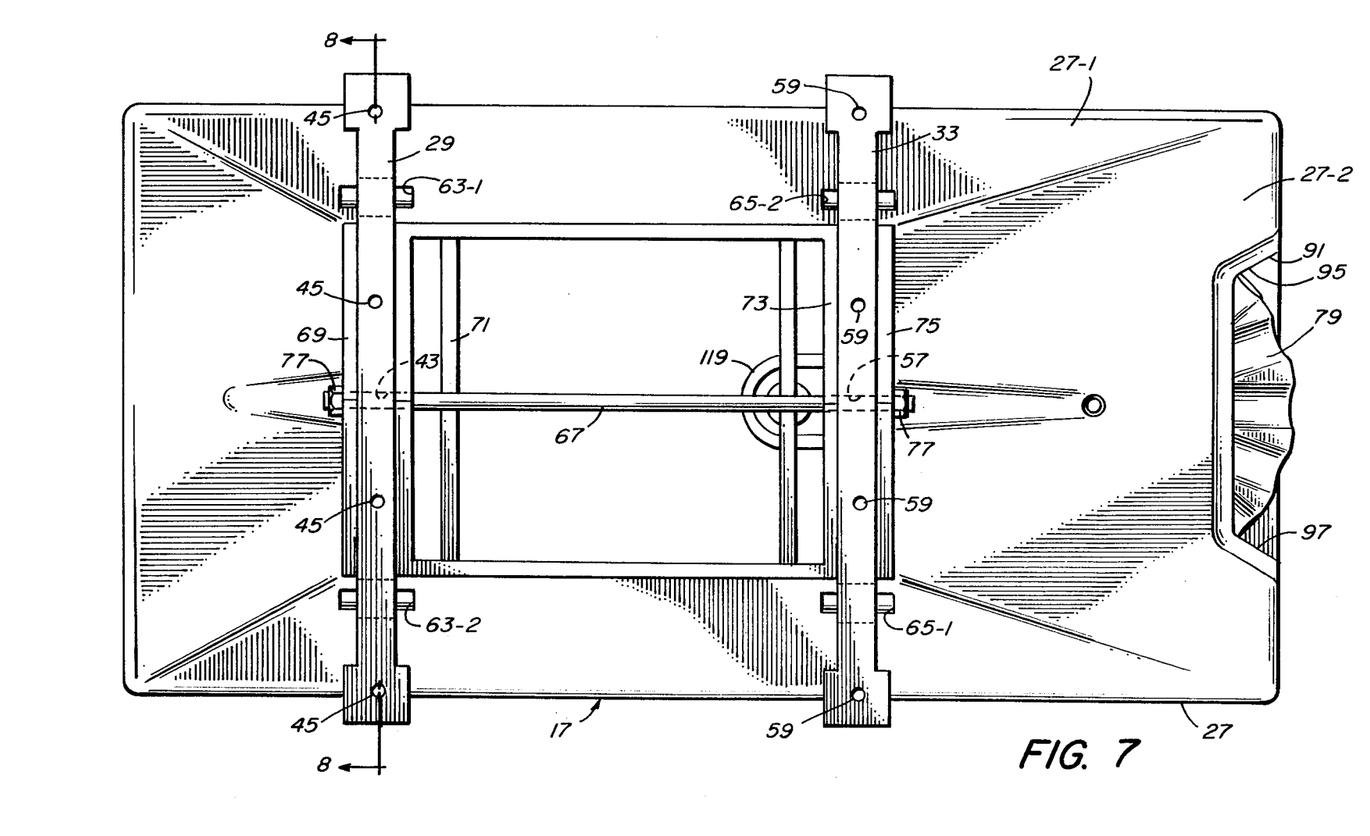
FIG. 7 is a plan view taken from the top of the intermediate block assembly shown in FIG. 6.
Figure 8:
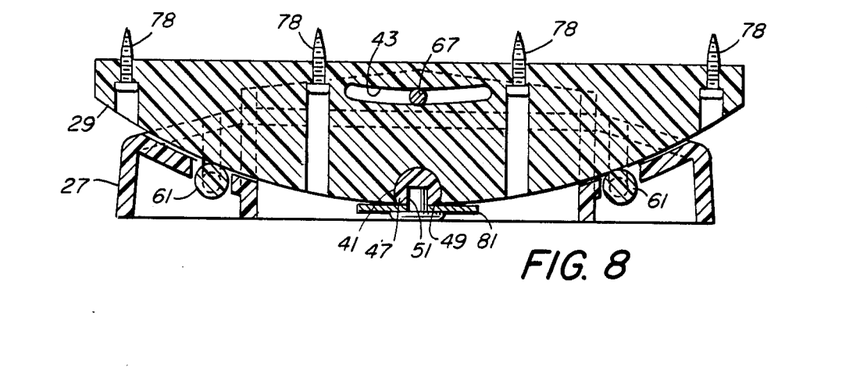
FIG. 8 is a section view taken along lines 8—8 in FIG. 7 with the rockers disposed horizontal relative to the bridge housing.
Figure 9:
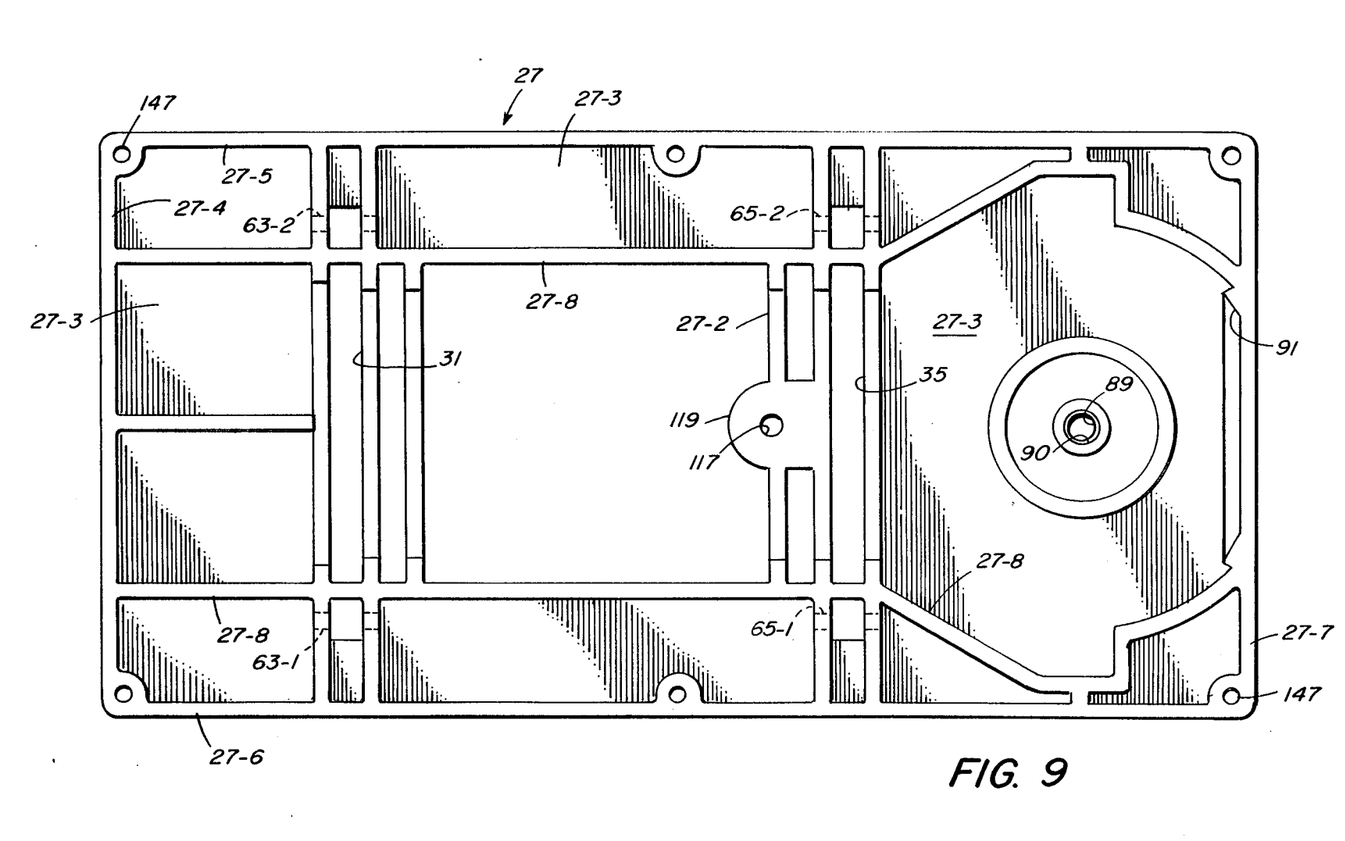
FIG. 9 is a plan view taken from the bottom of the bridge housing shown in FIG. 6.

A first rocker 29 is disposed in bridge housing 27 in a first transverse slot 31 formed near the left end and a second rocker 33 is disposed in bridge housing 27 in a second transverse slot 35 formed near the right end. As will hereinafter be seen, first rocker 29 is used to mechanically effect tilting movement of top member 13, while second rocker 33 is used to distribute the load carried by first rocker 29.

Figure 12:
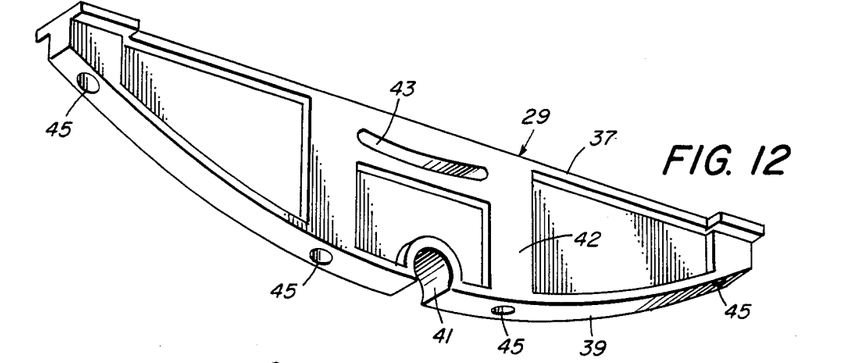
FIG. 12 is a perspective view of the left rocker shown in FIG. 6.

First rocker 29 (which is also shown in FIG. 12) is an elongated crescent shaped member made of rigid material such as plastic and includes a flat top surface 37, a main body portion 38, an arcuate shaped bottom surface 39 having a groove 41 at the center, an elongated arcuate shaped slot 43 in the main body portion 38 at the middle near the top and a set of four mounting holes 45. Groove 41 is a portion of a circle in cross-section with the portion being larger than a semicircle.

Figures 13, 18:
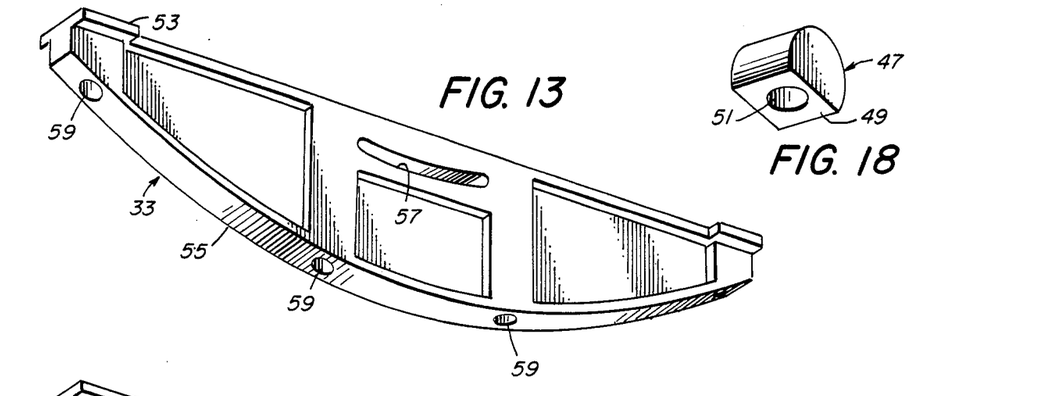
FIG. 13 is a perspective view of the right rocker shown in FIG. 6.
FIG. 18 is a perspective view of the knuckle shown in FIG. 6.

A knuckle element 47 made of a solid body of plastic and having a flat bottom 49 and a blind hole 51 extending upward from bottom 49 is slidably mounted within groove 41. Knuckle 47 is sized relative to groove 41 such that it fits snugly within groove 41 but can rotate freely about its longitudinal axis and move axially.

Second rocker 33, (see FIG. 13) is an elongated crescent shaped member made of rigid material such as plastic and includes a flat top surface 53, a main body portion 54, an arcuate shaped bottom surface 55, an elongate arcuate shaped slot 57 formed in main body portion at the middle near the top and a set of four vertical mounting holes 59. Except for the groove 41 in first rocker 29, second rocker 33 and first rocker 29 are identical in construction.

First rocker 29 is seated in first slot 31 on a first pair of rollers 61 which are disposed in a pair of longitudinal slots 63-1 and 63-2 formed in slot 31 in bridge housing 27, one slot 63 being near each end of slot 31. Second rocker 33 is seated in second slot 35 on another pair of rollers 61 which are disposed in a second pair of longitudinal slots 65-1 and 65-2 formed in slot 35 bridge housing 27, one slot 65 being near each end of slot 35. In addition to supporting rockers 29 and 33 within bridge housing 27, rollers 61 serve to enable rockers 29 and 33 to rock back and forth smoothly within their respective slots 31 and 33.

Figures 14, 16, 17:
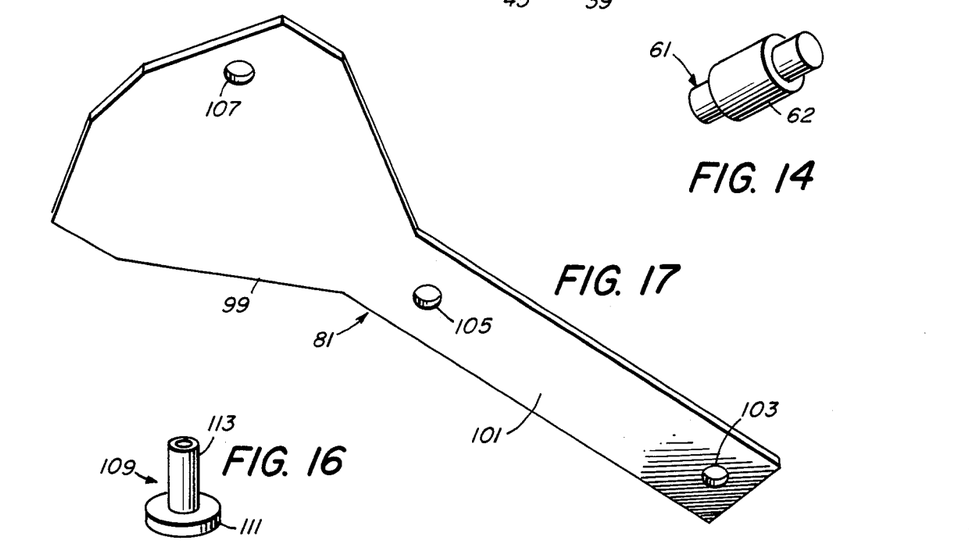
FIG. 14 is a perspective view of one of the rollers shown in FIG. 6.
FIG. 16 is a perspective view of one of the actuator pins shown in FIG. 6.
FIG. 17 is a perspective view of the lever arm shown in FIG. 6.

Rollers 61 are made of a rigid material and preferably metal. As can be seen in FIG. 14, the central section 61 of rollers 61 is somewhat larger in cross section than the width of slots 63 and 65 to limit their axial movement when they are seated in their slots.

Figure 15:
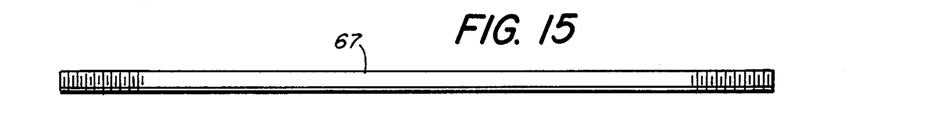
FIG. 15 is a perspective view of the securing rod shown in FIG. 6.

Rockers 29 and 33 are secured to bridge housing 27 by an elongated metal rod 67 which is threaded at each end. As can be seen in FIG. 7, rod 67 extends through a hole in the left side wall 69 of first slot 31, through slot 43 in first rocker 29, through a hole in the right side wall 71 of first slot 31, through a hole in the left side wall 73 of second slot 35, through slot 57 in second rocker 33, through a hole in the right side wall 75 of second slot 35 and fastened in place at each end by nuts 77. In addition, rockers are fixedly attached to the bottom of top member 13 through screws 79 which extend through the mounting holes 45 and 59 in the rockers and into mounting ribs 23 and 25.

Figure 10:
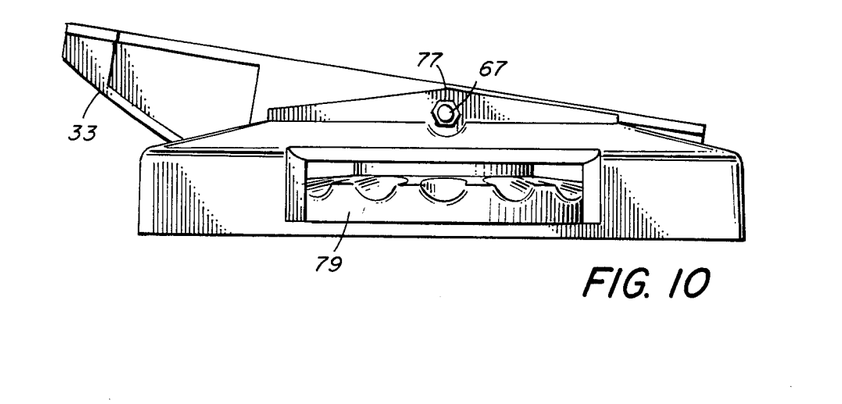
FIG. 10 is a right side view of the intermediate block assembly shown in FIG. 1 with the rockers tilted forward.
Figure 11:
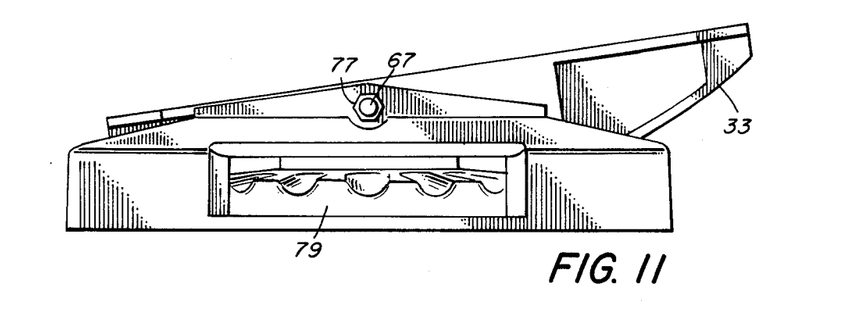
FIG. 11 is a right side view of the intermediate block assembly shown in FIG. 1 with the rockers tilted backward.

As can be appreciated, rocking movement of rockers 29 and 33 within their respective slots will cause a tilting movement of the top member 13 relative to bridge housing 27 as seen in FIGS. 10 and 11.

Intermediate block assembly 17 further includes a thumbwheel 79 and a lever arm 81.

Figure 19:
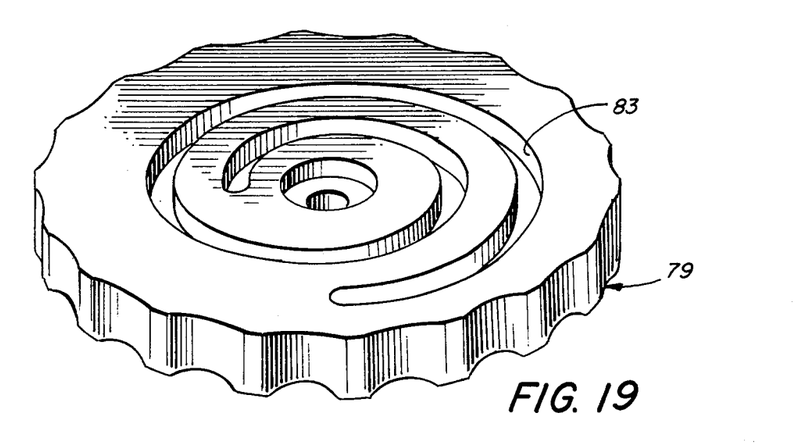
FIG. 19 is a perspective view of the thumbwheel shown in FIG. 6, taken from the bottom.
Figure 20:
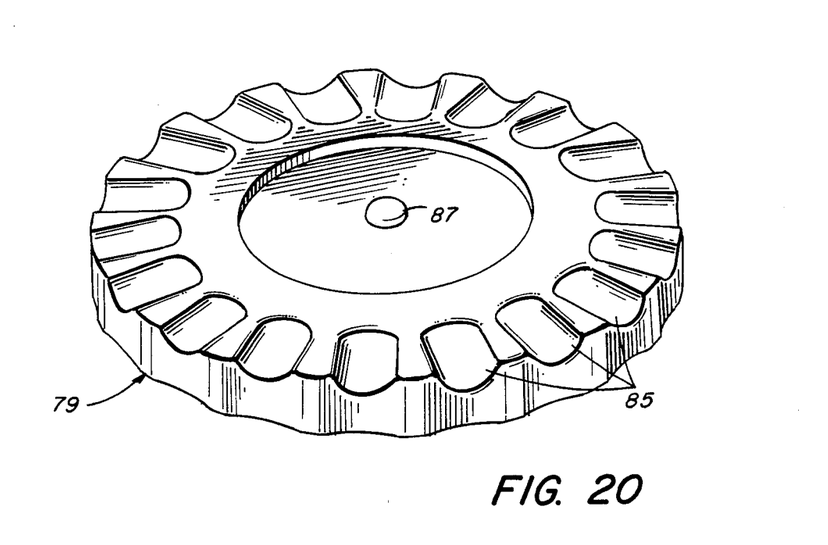
FIG. 20 is a perspective view of the thumbwheel shown in FIG. 6, taken from the top.

Thumbwheel 79 is made of a rigid material such as plastic and has a one and three fourths turns (i.e. about 650°) spiral groove 83 on its lower surface and a plurality of finger depressions on 85 on its upper surface which extend radially inward. Thumbwheel 71 is rotatably mounted on the underside of bridge housing 27 by a screw 87 which engages an internally threaded sleeve 89 which is fixedly secured in a hole 90 in bridge housing 27. As can be seen, thumbwheel 79 extends slightly outward from bridge housing 27 through a rectangular slot 91 formed in the right end wall 27-5. The side walls 95 and 97 of slot 91 are bevelled and extend close to the periphery of thumbwheel 79 to block inward movement of the thumb of the user in slot 91 as it turns the thumbwheel.

Lever arm 81 includes a head portion 99 and a tail portion 101 and has three actuator pin mounting holes. One hole 103 is located along the longitudinal axis near the outer end of the tail portion 101. The second hole 105 is located at the inner end of the tail portion along the longitudinal axis near the head portion and defines a fulcrum point of lever arm 81. The third hole 107 is located in the head portion and is offset from the longitudinal axis.

Lever arm 81 is pivotally coupled to first rocker 29 through a first actuator pin 109 which is slidably mounted in hole 103 and extends up into blind hole 51 in knuckle 47. Actuator pin 109 is made of a rigid material such as plastic and includes a head 111 and a shank 113. The cross-sectional diameter of the shank of actuator pin 109 is less than the cross-sectional diameter of blind hole 51 to accommodate arcillary tilting of actuator pin 109 as rocker 29 moves in bridge housing 27. Lever arm 81 is pivotally attached to bridge housing 27 through a second actuator pin 115 which acts as a fulcrum. Actuator pin 115 is slidably mounted in hole 105 and extends into a hole 117 formed in a boss 119 in bridge housing 27. Finally, lever arm 81 is coupled to thumbwheel 79 through a third actuator pin 121 which is slidably mounted in hole 103 and rides in spiral groove 83.

It is to be noted that, in addition to coupling lever arm 81 to rocker 29, to bridge housing 27 and to thumb wheel 79, the three actuator pins 109, 115 and 121 serve as supports for supporting intermediate block assembly 17 on base assembly 15.

In operation, turning of thumbwheel 79 drives actuator pin 121 riding within spiral grooves 83 along an arc having a radius established by the radius of curvature of the arcuate surface of rocker 29. This motion causes the lever arm 81 to pivot about actuator pin 115 coupled to bridge housing 27. This motion is transmitted to the tail end 101 of lever arm 81 and causes rocker 29 to tiltably move relative to bridge housing 27. Since rocker 29 is fixedly attached to top member 13, rocking of rocker 29 produces a corresponding tilting of top member 13. Since top member 13 is fixedly attached to rocker 33, tilting of top member 13 causes a corresponding tilting or rocking of rocker 33. Lateral movement of rockers 29 and 33 relative to rod 67, which is fixedly attached to bridge housing 27, is accommodated by the arcuate shaped slots 43 and 57 formed in rockers 29 and 33, respectively. It is to be noted that the direction of tilt is opposite that of the direction of translation of pin 121 riding in spiral groove 83.

As can be appreciated, lever arm 81 and thumbwheel 71 each produce a mechanical advantage which enables tilting of top member 13 with a force that is considerably less than the force needed to otherwise tilt the rockers 29 and 31. The mechanical advantage produced by lever 81 is dependent for the most part on the ratio of the distance between hole 103 and hole 105 and the distance between hole 105 and hole 107. The mechanical advantage produced by thumbwheel 79 is dependent for the most part on the ratio of the overall length of the spiral groove 83 and the arcuate distance travelled by pin 121 in spiral groove 83 as it traverses from one end to the other. Also, the angle through which top member 13 may be tilted is dependent mainly on the radius of curvature of the arcuate bottom surface of rocker 29 and the angular distance through which lever arm 81 is pivotally moved.

Figure 21:
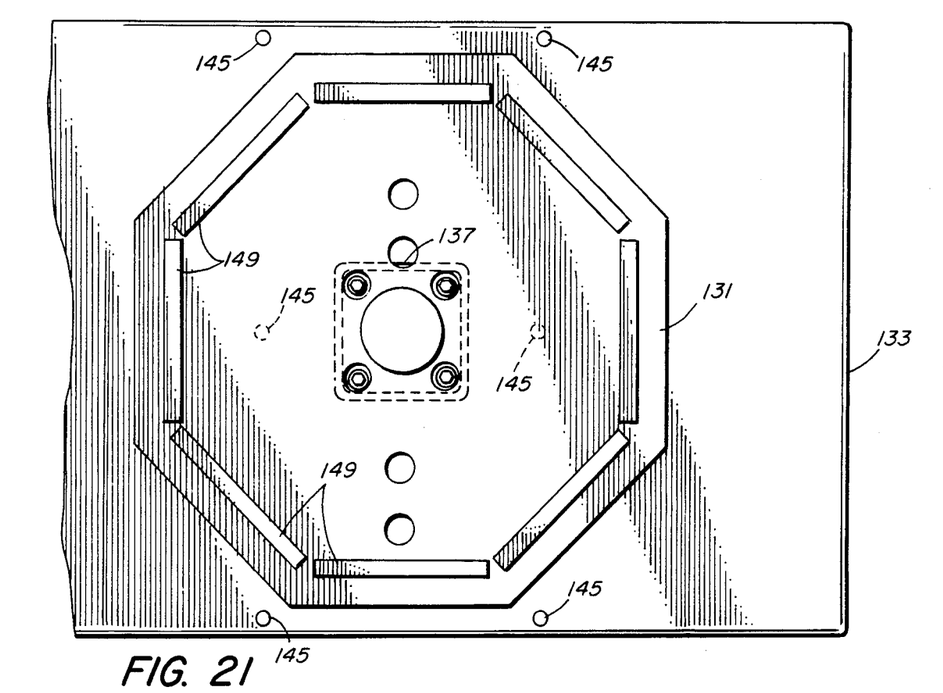
FIG. 21 is a plan view taken from the bottom of the base assembly shown in FIG. 1.
Figures 22, 23:
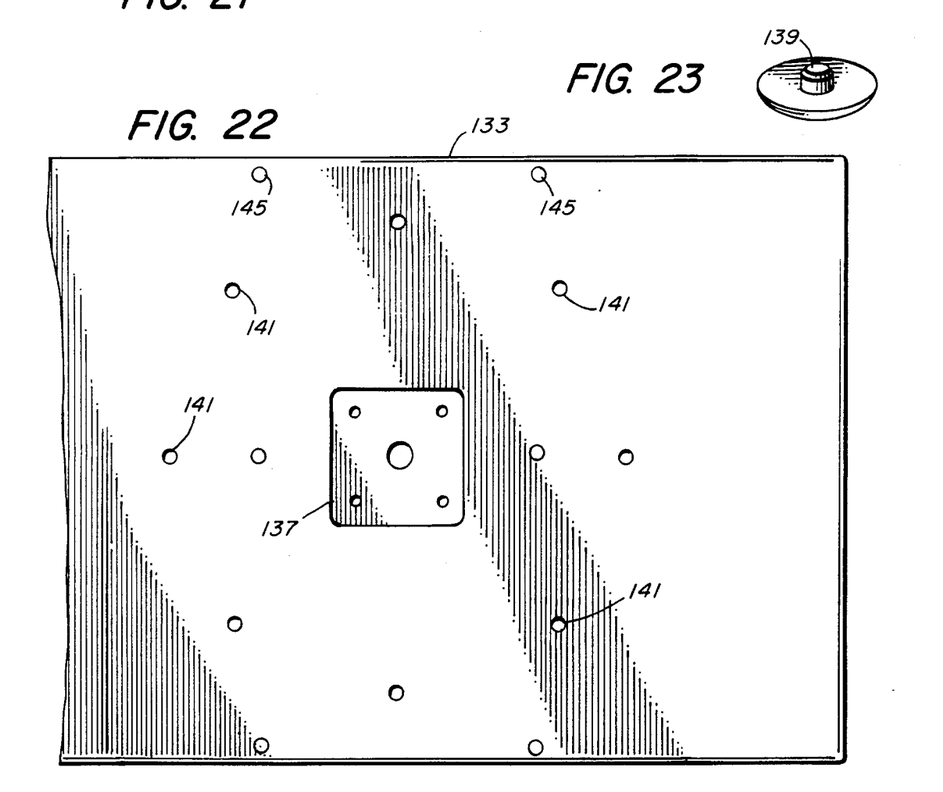
FIG. 22 is a plan view taken from the bottom of the top plate shown in FIG. 21.
FIG. 23 is a perspective view of one of the bumpers shown in FIG. 21.

Base assembly 15, (see FIGS. 2 and 3 and also FIGS. 21 through 23), includes a lower base plate 131. An upper base plate 133 is coupled to bottom plate 131 through a thrust bearing 135. The stationary element of thrust bearing 135 is fixedly secured to bottom plate 131 through an opening therein while the movable element of thrust bearing 135 is coupled to top plate 133 through a bracket 137 which is fastened thereto by screws 138. A set of bumpers 139 are press fit into holes 141 in top plate 133 and rest on bottom plate 131. Bumpers 139 are made of plastic and serve two purposes, namely, to distribute the load on top plate 133 over bottom plate 131 and to provide frictional drag on rotational movement of top plate 133 relative to bottom plate 131. Top plate 133 is fixedly attached to bridge housing 27 by screws 143 which extend through mounting holes 145 in top plate 133 and into mounting holes 147 in bridge housing 27. A plurality of strips of cork tape 149 are attached to the bottom surface of bottom plate 131 to prevent sliding movement of bottom plate 131 on the top surface of workstand S.

In assembling mounting assembly 11, rollers 61 are first dropped into their slots 63 and 65 in bridge housing 27. Rockers 29 and 33 are then dropped into their respective slots 31 and 35 in bridge housing 27 and secured in place with rod 61 and its associated nuts. Bridge housing 27 is then turned upside down. Thumbwheel 79 is then secured to bridge housing 27 and knuckle 47 inserted axially into groove 41. Lever arm 81 is then placed on top of bridge housing and secured in place by the three actuator pins 109, 111 and 117. The base assembly is then assembled and attached to the bridge housing 27. Rockers 29 and 33 are then attached to the top member 13. When the assembly is turned right side up the shape of groove 41 (i.e. greater than 180° in circumference) prevents the knuckle from falling out.

It is not possible to predict the actual load on top member 13 because of the difference in weight of different video display terminals and where the video display terminal is placed by the user on top member 13 in relation to the center of gravity of mounting assembly 11. Assuming a video display terminal D having a weight of 90 lbs. centered over the fulcrum of mounting assembly 11 that has a center of gravity 7 inches about the top, then a 7° tilt of top member 13 will present a 45 lb. load to the lever arm 81. If thumbwheel 79 has a 630° spiral groove and a circumference of 21.99 inches, the radius of curvature of the arcuate bottom surface 39 of rocker 29 is 6.75 inches, the distance between hole 103 and hole 105 is 7.312 inches, the distance between hole 105 and hole 107 is 5.500 inches and hole 107 is offset 1.625 inches from the centerline (of lever arm 81), then a 630° rotation of thumbwheel 79 will traverse rocker 29 a distance of 1.750 inches ($\pm 7° = 14°$ total), measured along an arc. The resulting mechanical advantage produced by thumbwheel 79 and lever arm 81 will be equal to 21.99/0.875 or 27 to 1. Therefore, a 45 lb. load on lever arm 81 can be moved with a force of 45/27 or 1.66 lbs. on the edge of thumbwheel. It is to be noted that the above calculations do not allow for friction.

Although a specific preferred embodiment of the invention has been disclosed herein in detail, it is to be understood that this is for the purpose of illustrating the invention, and should not be construed as necessarily limiting the scope of the invention, since it is apparent that many changes can be made to the disclosed structure by those skilled in the art to suit particular applications.

What is claimed is:

1. A mounting assembly for use in mounting a video display terminal on a load supporting surface comprising:
   a. a top member for receiving thereon said video display terminal,
   b. a base assembly for engaging said load supporting surface, and
   c. an intermediate block assembly disposed between said top member and said base assembly, said intermediate block assembly including:
      i. a bridge housing fixedly attached to said base assembly,
      ii. a first rocker fixedly attached to said top member and seated for rocking movement on said bridge housing,
      iii. a lever arm pivotally coupled at an intermediate location along its length to said bridge housing and pivotally coupled at one end to said first rocker, and
      iv. a second rocker fixedly attached to the top member and seated for rocking movement on the bridge housing,
   d. whereby pivotal movement of said lever arm will cause a corresponding tilting of said top member relative to said base assembly,
   e. wherein said intermediate block assembly further includes a thumbwheel rotatably mounted on said bridge housing and pivotally attached to the other end of said lever arm, whereby rotation of said thumbwheel will cause a pivoting movement of said lever arm.

2. The mounting assembly of claim 1 and further including means for securing said first and second rockers to said bridge housing.

3. The mounting assembly of claim 2 and wherein said bridge housing includes a pair of spaced apart transverse slots and said rockers are seated in said slots.

4. The mounting assembly of claim 3 and wherein said base assembly includes:
   a. a top plate fixedly attached to said bridge housing,
   b. a bottom plate below said top plate, and
   c. a bearing disposed between said top plate and said bottom plate and connected to said top plate and said bottom plate for enabling rotational movement of said top plate relative to said bottom plate,
   d. whereby rotational movement of said top plate relative to said bottom plate will produce rotational movement of said top member relative to said load supporting surface.

5. The mounting assembly of claim 4 and further including roller means disposed between said rockers and said bridge housing for supporting said rockers in said bridge housing and enabling smooth rocking movement of said rockers relative to said bridge housing.

6. The mounting assembly of claim 5 and further including bumper means mounted on said upper plate of said base assembly and extending downward and in contact with said bottom plate of said base assembly for distributing the load carried by the upper plate over the bottom plate.

7. The mounting assembly of claim 6 and wherein said thumbwheel includes a spiral groove on one surface and said intermediate block assembly further includes an actuator pin extending through a hole in said lever arm and riding in said spiral groove.

8. The mounting assembly of claim 7 and wherein said first rocker is a crescent shaped member having a flat top surface and an arcuate bottom surface.

9. The mounting assembly of claim 8 and wherein said first rocker includes a groove on its bottom surface and said intermediate block assembly includes a knuckle rotatably mounted in said groove for coupling said first rocker to said lever arm.

10. The mounting assembly of claim 9 and wherein said bridge housing is a unitary structure made of plastic.

11. A mounting assembly for use in supporting a video display monitor on a load supporting surface comprising:
 a. a top member for receiving thereon said video display monitor,
 b. a base assembly for engaging said load supporting surface, and
 c. an intermediate block assembly disposed between said table top and said base assembly said intermediate block assembly including:
   i. a bridge housing fixedly attached to said base assembly,
   ii. a first crescent shaped rocker seated on said bridge housing for rocking movement thereon and fixedly attached to said top member,
   iii. a second crescent shaped rocker seated on said bridge housing for rocking movement thereon in spaced apart relationship from said first rocker and fixedly attached to said top member,
   iv. a lever arm attached at one end to said first rocker and pivotally attached at an intermediate location along its length to said bridge housing, said intermediate location defining the fulcrum of said lever arm,
   v. a thumbwheel rotatably mounted on said bridge housing and coupled to the other end of the lever arm, whereby, rotation of said thumbwheel will cause pivotal movement of said lever arm,
   vi. whereby, pivotal movement of said lever arm about its fulcrum will cause rocking movement of said rockers about and relative to said bridge housing producing thereby a tilting movement of said top member relative to said base assembly.

12. The mounting assembly of claim 11 and further including means for securing said rockers to said bridge housing without limiting rocking movement of said rockers relative to said bridge housing.

13. The mounting assembly of claim 12 and wherein said base assembly includes:
 a. a top plate said top plate being attached to said bridge housing,
 b. a bottom plate said bottom plate being adapted to seat on said load supporting surface, and
 c. a bearing disposed between said top plate and said bottom plate and connected to said top plate and said bottom plate, and
 d. whereby rotational movement of said top plate relative to said bottom plate will produce rotational movement of said top member relative to said load supporting surface.

14. The portable table of claim 13 and further including roller means for supporting said rockers in said bridge housing enabling smooth rotational movement of said rockers relative to said bridge housing.

15. A tiltable mounting assembly comprising:
 a. a top member,
 b. a base assembly,
 c. an intermediate assembly disposed between said top member and said base assembly,
 d. said intermediate assembly including:
   i. a bridge housing,
   ii. a first rocker seated on said bridge housing for rocking movement relative to said bridge housing and fixedly attached to said top member, and
   iii. a second rocker seated on said bridge housing for rocking movement relative to said bridge housing and fixedly attached to said top member, and
 e. means for rocking said first rocker relative to the bridge housing whereby said rocking will cause tilting movement of said top member relative to said base assembly, said means for rocking comprising a lever arm coupled to said first rocker and to said bridge housing, and rotatable means including a thumbwheel coupled to said lever arm and adapted and configured so that rotation thereof will cause a movement of said lever arm and thereby rocking of said first rocker.

16. A tiltable mounting assembly comprising:
 a. a top member,
 b. a base assembly,
 c. an intermediate assembly disposed between said top member and said base assembly,
 d. said intermediate assembly including:
   i. a bridge housing,
   ii. a first rocker seated on said bridge housing for rocking movement relative to said bridge housing and fixedly attached to said top member, said first rocker including a groove on its bottom surface,
   iii. a lever arm pivotally coupled to said bridge housing, and
   iv. a knuckle rotatably mounted in said groove for coupling the first rocker to said lever arm, and
 e. means for rocking said first rocker relative to the bridge housing whereby said rocking will cause tilting movement of said top member relative to said base assembly.

17. The tiltable mounting assembly of claim 16 wherein the means for rocking includes a thumbwheel rotatably mounted on said bridge housing and coupled to the level arm, whereby rotation of the thumbwheel will cause pivotal movement of said level arm and thereby will rock said first rocker.

* * * * *